Oct. 8, 1957  W. R. HOUSE  2,808,968
APPARATUS FOR DISCHARGING POWDERED BULK MATERIALS
Filed Sept. 28, 1953
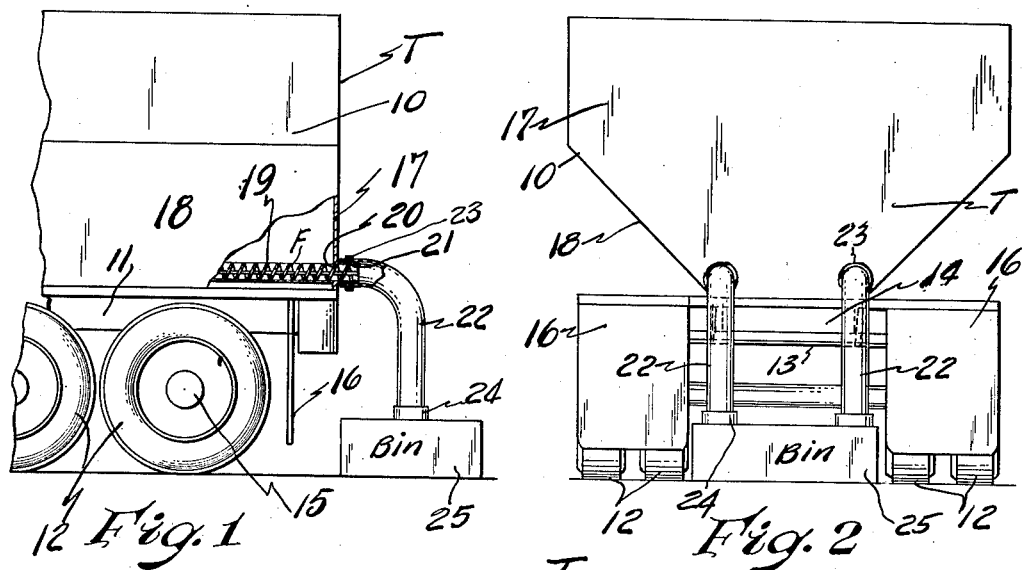
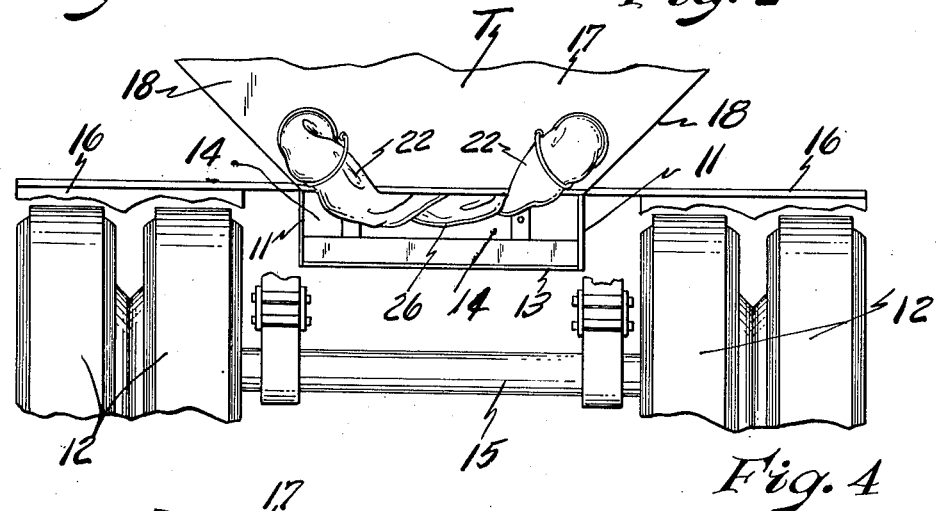
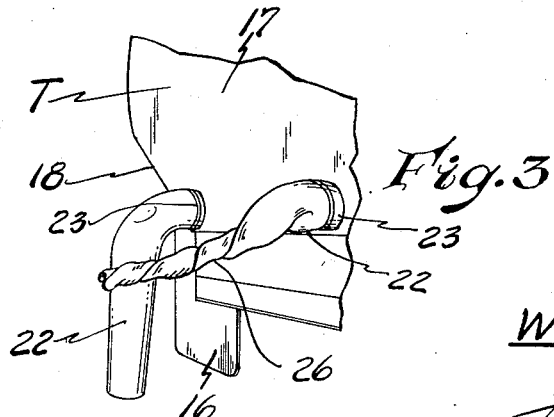
INVENTOR.
William R. House.
BY
Fearman & Fearman.
ATTORNEYS

United States Patent Office 2,808,968
Patented Oct. 8, 1957

2,808,968

APPARATUS FOR DISCHARGING POWDERED BULK MATERIALS

William R. House, Bay City, Mich.

Application September 28, 1953, Serial No. 382,792

9 Claims. (Cl. 222—271)

This invention relates to apparatus for handling bulk materials and more particularly to apparatus for discharging cement and other pulverized or powder materials from trailer tanks and the like.

In conventional practice, discharge doors are provided in trailer tanks which are commonly used to transport bulk materials in large quantities, and finely ground materials, such as cement, pass from the doors, into the atmosphere and are usually directed into a suitable receptacle or bin. Screw conveyors have been and are presently employed within the tank or body to deliver the materials to the discharge doors. This practice has several disadvantages in that a considerable amount of the material is entrained by the atmosphere in the form of dust which results in the loss of the material, and it is further very objectionable from the standpoint of both health and comfort to people working in the immediate vicinity. Further, the dust will, of course, settle in the surrounding area, thus rendering it dirty and unslightly and the fine material will, of course, be continuously blown about by gusts of wind.

One of the prime objects of my invention is to provide discharge apparatus which prevents the escape of this fine dust, in that the material is conveyed from the tank directly to its bin or destination without being exposed to the atmosphere.

A further object of the invention is to provide a flexible discharge apparatus which does not require that the trailer be accurately moved into exact alignment with a given space in order to discharge thereinto.

Another object of the invention is to design discharge apparatus including flexible, resilient tubes which can be simply twisted and tied off to shut off the flow of material therethrough, the apparatus including pairs of depending tubes whose ends can simply be tied together and pushed up under the tank to an out-of-the-way position.

A further object of the invention is to provide discharge apparatus for trailer tanks in which screw conveyors project beyond the marginal end wall of the tank, and resilient tubes are releasably connected thereto, the flights of the conveyor restricting the surge of the material, and the tubes being expansible to handle the initial surge thereof when the tubes are open and connected to convey the material to its destination.

A further object of the invention is to design simple, practical and economical discharge apparatus of durable construction which is economcial to manufacture and install, and which can be readily incorporated in existing trailer tanks without necessitating extensive change in the design thereof.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a fragmentary, part sectional, side elevational view of a trailer tank which incorporates my novel discharge apparatus, said apparatus being shown delivering material to a storage bin.

Fig. 2 is a rear elevational view thereof.

Fig. 3 is a fragmentary, perspective rear view of a trailer tank which incorporates my discharge apparatus, illustrating the manner in which one of the tubes can be twisted and tied off to shut off the flow of material therethrough.

Fig. 4 is a fragmentary, rear elevational view of a trailer tank which incorporates my discharge apparatus, illustrating the manner in which the depending tubes can be tied together to shut off the flow of material therethrough.

Referring now more particularly to the acompanying drawing in which I have shown the preferred embodiment of my invention, a letter T generally indicates a conventional trailer tank which includes broadly a tank 10 mounted on a vehicle frame 11 which is supported by wheels 12 as usual. The tank 10 and frame 11 project rearwardly of the wheels 12 as shown, and a plate 13 is secured to the bottom of the frame, thus forming a housing 14 as shown.

The axles on which the wheels are journaled are indicated at 15, and the depending guards for the wheels are indicated at 16. It is conventional practice to employ a tank 10 with a rear wall 17 and inwardly sloped walls 18 on trailers of this type, and pairs of longitudinally disposed motor driven screw conveyors 19 including helical flights F have been provided in the bottom of the tanks to deliver the bulk material to the rear thereof.

A discharge door (not shown) is usually provided in the rear wall of the tank 10 between the conveyors 19 to permit access to the tank, and the conveyors 19 project beyond the rear wall 10a of the tank and for a purpose to be presently described.

To practice the instant invention, openings 20 are provided in the rear wall 10a of the tank 10, and tubular conveyor extensions or housings 21 are secured to the tank and project rearwardly therefrom, all as clearly shown in Fig. 1 of the drawing. The ends of the conveyor flights extend into the tubular housings 21, and fitted over said housings are resilient, flexible discharge tubes 22 which are molded in substantially L-shaped form from a readily expansible and durable rubber material, similar to the rubber employed in vehicle tire inner tubes. Removable ring clamps 23 secure the upper ends of the tubes in position on the housings 21, and it will be observed that the opposite ends of the tubes, when in use, form an L-shaped extension of the housing which can be readily inserted into the spouts 24 of the storage bin or container 25, only that portion of the bin which extends above the ground level being shown in Figs. 1 and 2.

It will be clear that, except for the provision of the extensions 21, the tremendous pressure created by the material in the tank would overload the tubes 22 and either burst them or tear them from the housings 21. This would be particularly true when the tubes 22 were first untwisted and the air entrapped therein was permitted to escape. The end of the flights on the conveyor 19 which are disposed within the rigid housings 21, however, restrict the surge of the material and absorb most of the pressure load of the material in the tank. Further, since the tubes 22 are expansible, the reduced initial surge of the material can be readily handled by said tubes without ill effect. Under these circumstances, the tubes 22 can also be twisted and the ends knotted as indicated at 26 in Fig. 3 to stop the flow of material therethrough, even though the tank 10 has been only partially emptied. The knotted ends of the tubes 22 can then be pushed into the housings 13 so that they will be out of the way when the trailer tank T is traveling from one destination to another. In Fig. 4 I have shown the twisted ends of the tubes 22 tied together and disposed in the housing 13 in inoperative position which is a preferred manner of securing them.

While I have shown by discharge apparatus applied to trailer tanks, it will be apparent that the device may also find application in storage bins and the like, and it is to be understood that I intend the above-described embodiment to be illustrative rather than limiting. It is further to be understood that various equivalent changes may be made in the various elements of the apparatus without departing from the spirit of the invention or the scope of the subjoined claims.

What I claim is:

1. In a discharge apparatus for a bulk material tank in which is disposed a longitudinally extending driven screw conveyor to deliver material to the rear of the tank, a rigid, tubular housing covering the rear end of said conveyor except for a discharge opening therein, and an expansible, flexible elastic discharge tube fitted over said housing to deliver material from said tank through said opening to its destination.

2. In a discharge apparatus for a bulk material tank which includes side walls and front and rear end walls, a longitudinally disposed, motor-driven screw conveyor provided in the bottom of the tank to deliver material to the rear of said tank, the rear end wall of said conveyor having an opening through which the one end of said conveyor projects, a tubular housing open at the front and rear ends thereof rigidly connected to the rear wall of said tank adjacent said opening and into which said conveyor projects, and an expansible, flexible discharge tube formed of an elastic rubber material fitted over the rear end of said housing to deliver material from said housing to its destination.

3. The combination defined in claim 2 in which said tubes are inversely L-shaped in form and ring clamps are employed to secure the upper ends thereof to said housings.

4. In a discharge apparatus for a bulk material tank, the bottom of which is provided with a pair of spaced-apart, longitudinally disposed, motor driven screw conveyors to deliver material to the rear end of said tank, rigid, tubular housings connected to the end wall of the tank in axial alignment with said conveyors and open at the front and rear ends, thereof, the rear ends of said conveyors extending into said housings and terminating adjacent the open rear ends thereof, and an expansible flexible, elastic discharge tube fitted over each housing and extending therefrom to deliver material from said tank, said tubes being in sufficiently closely spaced relation and being of sufficient length to permit them to be twisted and tied together to shut off the flow of material therethrough.

5. In a discharge apparatus for a bulk material tank which includes converging side walls and front and rear end walls, a pair of motor driven screw conveyors in the bottom of the tank to deliver material to the rear thereof, the rear end walls of said tank having openings therethrough adjacent the ends of said conveyors, extension housings fixed to the rear end of said tank and open at the front and rear ends thereof, the rear ends of said conveyors extending into the extension housings and terminating adjacent the open rear ends thereof, expansible, flexible, elastic rubber discharge tubes fitted over each housing and depending therefrom to deliver material from said housing to its destination, each of said tubes being of greater length than half of the spaced distance between said conveyors to permit the free ends thereof to be twisted and tied together to shut off the flow of material therethrough, said tubes being of substantially the elasticity and having walls of sustantially the thickness of automobile tire inner tubes.

6. In a discharge apparatus for a bulk material tank which includes side walls and front and rear end walls, a pair of motor-driven screw conveyors in the bottom of the tank to deliver material to the rear thereof, the rear end walls of said tank having openings therethrough adjacent the ends of said conveyors, extension housings fitted to the rear end of said tank and open at the front and rear ends thereof, the rear ends of said conveyors extending into the extension housings and terminating adjacent the open rear ends thereof, flexible discharge tubes fitted over each housing and depending therefrom to deliver material from said housing to its destination, each of said tubes being of greater length than half of the spaced distance between said conveyors to permit the free ends thereof to be twisted and tied together to shut off the flow of material therethrough.

7. In combination with a bulk material truck tank which includes a rear end wall, a motor actuated conveyor provided in the bottom of the tank to deliver material to the rear of said tank, a substantially rigid tubular housing in communication with the tank near the rear end of said conveyor, said housing being open at the ends thereof, and an expansible, flexible, elongated, resilient discharge tube fitted over said housing to deliver material from said tank through the housing to its destination, said tube expanding with the initial surge of the material without rending of the tube or blocking thereof.

8. In combination with a bulk material truck tank which includes side walls, front and rear end walls, and a bottom, a motor actuated conveyor provided in the bottom portion of the tank to deliver material to an area at the rear of the tank; and an expansible, flexible, elongated resilient discharge tube member mounted on said tank at said area and leading from said tank, the tube being open at the ends thereof to convey material from said area to a destination outside said tank and expanding with the initial surge of the material to pass the material without rending of the tube or blocking thereof.

9. In combination with a bulk material truck body which includes a bottom and side, front, and rear end walls, means for moving bulk material towards the rear end of the body for discharge therefrom, and an open-end, flexible, discharge tube member mounted on said body at the rear thereof and in communication with the interior of said body for receiving and conveying material discharged from said body, said tube member being formed of resilient material expansible with the initial surge of material into said tube member during discharge.

References Cited in the file of this patent

UNITED STATES PATENTS

| | | |
|---|---|---|
| 1,822,530 | Kind | Sept. 8, 1931 |
| 2,063,652 | Woodruff | Dec. 8, 1936 |
| 2,110,262 | Curtis | Mar. 8, 1938 |
| 2,190,727 | McKenna | Feb. 20, 1940 |
| 2,222,083 | Lintz | Nov. 19, 1940 |
| 2,412,121 | Bradshaw | Dec. 3, 1946 |
| 2,542,910 | Dosier | Feb. 20, 1951 |
| 2,554,050 | Neubeck | May 22, 1951 |
| 2,606,645 | Heine | Aug. 12, 1952 |

FOREIGN PATENTS

| | | |
|---|---|---|
| 138,547 | Australia | Sept. 1, 1950 |